(12) United States Patent
Chon et al.

(10) Patent No.: US 9,790,096 B2
(45) Date of Patent: Oct. 17, 2017

(54) BORON RECOVERY APPARATUS, BORON RECOVERY METHOD, AND BORON RECOVERY SYSTEM

(71) Applicants: POSCO, Pohang-si, Gyeongsangbuk-do (KR); RESEARCH INSTITUTE OF INDUSTRIAL SCIENCE & TECHNOLOGY, Pohang-si, Gyeongsangbuk-do (KR); MPPLY CO., LTD., Daejeon (KR)

(72) Inventors: Uong Chon, Pohang-si (KR); Ki Young Kim, Pohang-si (KR); Gi-Chun Han, Cheongju-si (KR); Im Chang Lee, Daejeon (KR); Young Seok Jang, Pohang-si (KR); Sou Hwan Son, Pohang-si (KR)

(73) Assignees: POSCO, Pohang-si, Gyeongsangbuk-Do (KR); RESEARCH INSTITUTE OF INDUSTRIAL SCIENCE & TECHNOLOGY, Pohang-si, Gyeongsangbuk-Do (KR); MMPLY CO., LTD., Daejeon (KR)

( * ) Notice: Subject to any disclaimer, the term of this patent is extended or adjusted under 35 U.S.C. 154(b) by 277 days.

(21) Appl. No.: 14/390,291

(22) PCT Filed: Dec. 27, 2012

(86) PCT No.: PCT/KR2012/011606
§ 371 (c)(1),
(2) Date: Oct. 2, 2014

(87) PCT Pub. No.: WO2013/151226
PCT Pub. Date: Oct. 10, 2013

(65) Prior Publication Data
US 2015/0118130 A1    Apr. 30, 2015

(30) Foreign Application Priority Data

Apr. 5, 2012    (KR) .................. 10-2012-0035716

(51) Int. Cl.
*C01B 35/12*    (2006.01)
*B01J 19/00*    (2006.01)
(Continued)

(52) U.S. Cl.
CPC .......... *C01B 35/122* (2013.01); *B01J 8/0015* (2013.01); *B01J 19/0006* (2013.01); *B01J 19/24* (2013.01);
(Continued)

(58) Field of Classification Search
None
See application file for complete search history.

(56) References Cited

U.S. PATENT DOCUMENTS

| 1,573,259 | A | * | 2/1926 | Lowry | .................. C01B 35/06 423/190 |
| 1,991,410 | A | * | 2/1935 | Newman | .................. C01B 35/06 23/301 |

(Continued)

FOREIGN PATENT DOCUMENTS

| CN | 1821117 | 8/2006 |
| JP | 10-314796 A | 12/1998 |

(Continued)

OTHER PUBLICATIONS

"Techniques to Treat Specific Substances from Power Plant." Thermal and Nuclear Power Generation, Dec. 2002, pp. 98-108.
(Continued)

*Primary Examiner* — Wayne Langel
(74) *Attorney, Agent, or Firm* — Finnegan, Henderson, Farabow, Garrett & Dunner, LLP

(57) ABSTRACT

Disclosed is a boron recovering device including: an aeration-type water-channel reactor including a water channel; at least one aeration unit disposed in the water channel and aerating a boron-containing solution by passing it through the water channel to deposit boron in the form of borax; and a precipitation bath precipitating the deposited borax in the boron-containing solution having passed through the aeration-type water-channel reactor and separating a filtrate by overflowing, a boron recovering device, a method of recovering boron, and a boron recovering system.

3 Claims, 4 Drawing Sheets

(51) Int. Cl.
*C02F 1/74* (2006.01)
*B01J 8/00* (2006.01)
*B01J 19/24* (2006.01)
*C02F 1/52* (2006.01)
*C02F 101/10* (2006.01)

(52) U.S. Cl.
CPC ....... *C02F 1/74* (2013.01); *B01J 2208/00752* (2013.01); *B01J 2219/00177* (2013.01); *C02F 1/52* (2013.01); *C02F 2101/108* (2013.01)

(56) References Cited

U.S. PATENT DOCUMENTS

| | | | | |
|---|---|---|---|---|
| 3,399,976 A | * | 9/1968 | Randolph | C01B 35/06 23/295 R |
| 3,403,984 A | * | 10/1968 | Mollard | B01D 9/0004 252/186.3 |
| 3,729,545 A | * | 4/1973 | Castin et al. | C01B 35/06 203/33 |
| 3,832,447 A | * | 8/1974 | Dillenburg | C01B 15/12 423/281 |
| 4,088,451 A | * | 5/1978 | Sadan | B01D 9/0018 159/15 |
| 4,857,286 A | * | 8/1989 | Mazzinghi | C01B 35/123 423/277 |
| 8,894,834 B2 | * | 11/2014 | Freydina | B01D 61/46 204/519 |
| 2008/0072374 A1 | * | 3/2008 | Abesingha | A47K 3/02 4/580 |
| 2009/0320622 A1 | * | 12/2009 | Mueller | B01J 19/0093 73/864.11 |
| 2010/0303695 A1 | * | 12/2010 | Gonzalez Ospina | C02F 3/006 423/237 |
| 2011/0197970 A1 | * | 8/2011 | Beldring | F04D 13/16 137/1 |
| 2012/0118035 A1 | * | 5/2012 | Zhao | C05F 5/008 71/32 |
| 2012/0231504 A1 | * | 9/2012 | Niazi | C12M 23/14 435/69.4 |

FOREIGN PATENT DOCUMENTS

| | | |
|---|---|---|
| JP | 2001-335315 | 12/2001 |
| JP | 3-851491 | 11/2006 |
| JP | 2008-237986 | 10/2008 |
| JP | 2009-233641 A | 10/2009 |
| JP | 2011-131143 | 7/2011 |
| JP | 4-844906 | 12/2011 |
| JP | 2012-58033 A | 3/2012 |
| KR | 10-2006-0087457 | 8/2006 |
| KR | 10-2007-0050845 A | 5/2007 |
| KR | 10-2012-0038147 A | 4/2012 |
| WO | WO 2015/135088 | 9/2015 |

OTHER PUBLICATIONS

English-language Abstract of Chile Patent Application No. CL 2014000579. "Continuous and Modular Treatment System for Removing Boron, Consisting of a Boron Removal System Together With a Resin Regeneration System Including Three Columns", Ulrike et al. (Jun. 20, 2014).
English-language translation of the International Search Report from the Korean Intellectual Property Office in corresponding International Application No. PCT/KR2012/011606 mailed Apr. 19, 2013.

* cited by examiner

[FIG. 1]
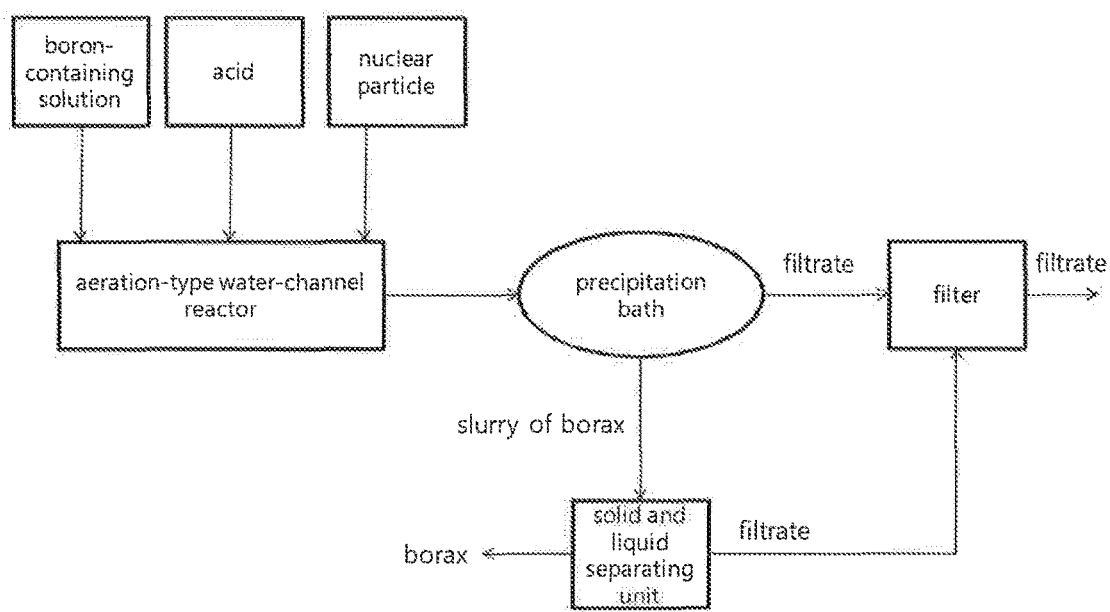

[FIG. 2]
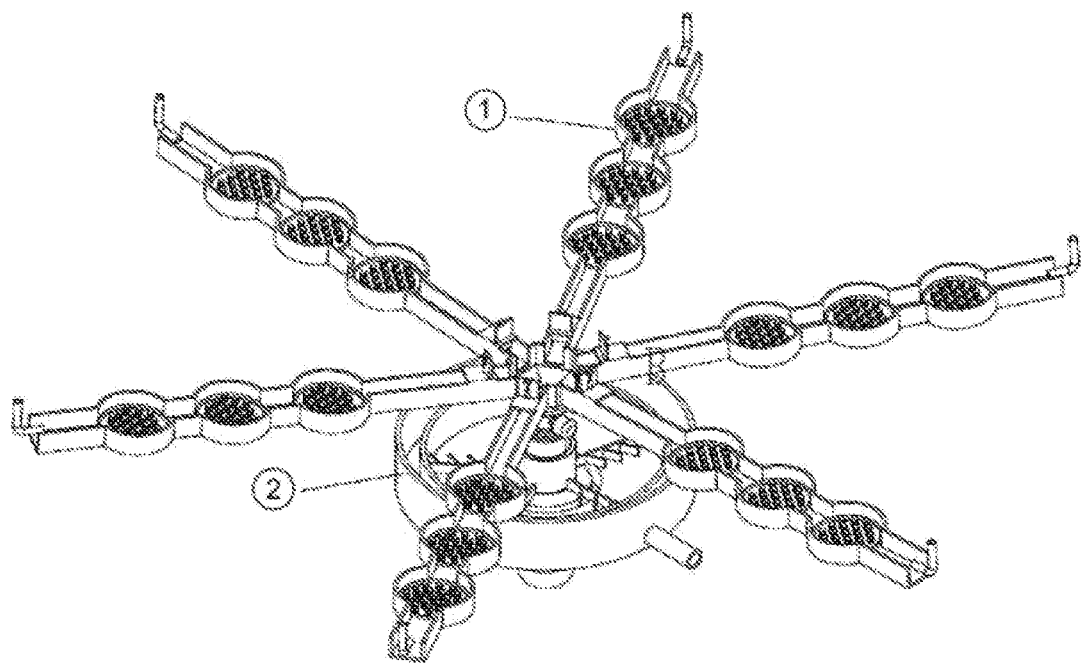

[FIG. 3]
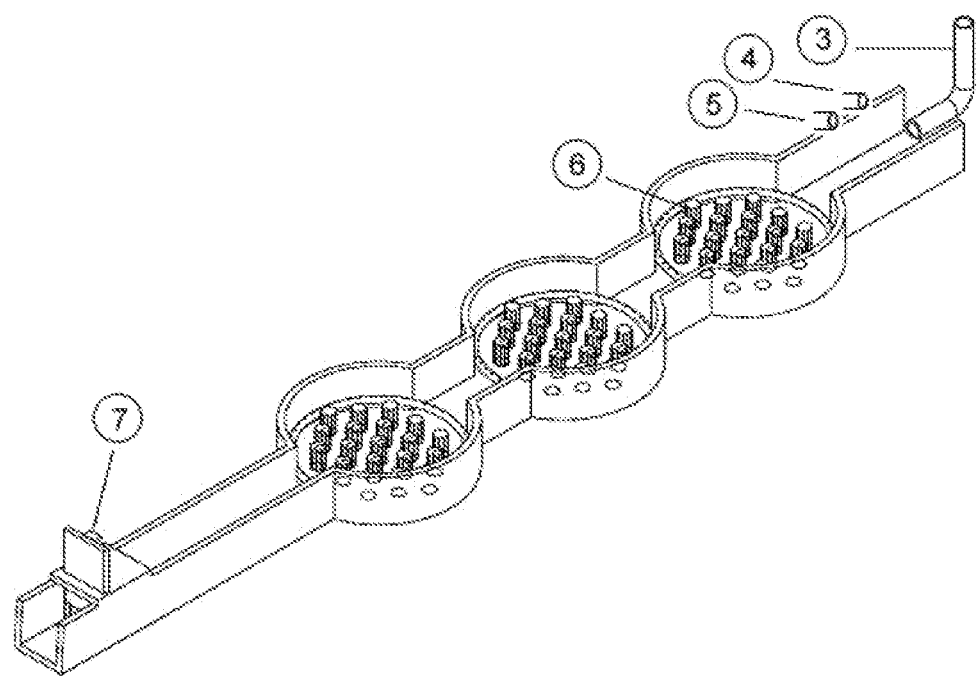

[FIG. 4]
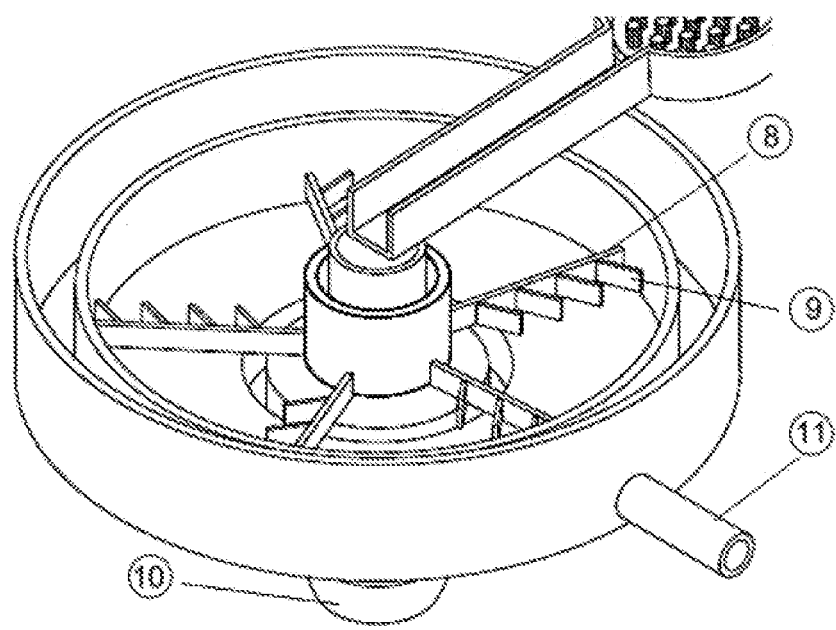

BORON RECOVERY APPARATUS, BORON RECOVERY METHOD, AND BORON RECOVERY SYSTEM

TECHNICAL FIELD

A boron recovering device, a method of recovering boron, and a boron recovering system are disclosed.

BACKGROUND ART

Most commercially available boron (B) compounds are extracted from boron-containing minerals.

About 10 different kinds of economical boron-containing minerals are present world wide, but extracting commercially available boron compounds such as borax, boric acid, and the like is expensive because processing the raw minerals requires several steps. However, it is very difficult to produce a high purity product through the process.

Generally, the method of extracting boron present in brine includes absorbing boron in the brine using an ion exchange resin to selectively absorb boron, and desorbing the same by washing it with an acid to recover it.

Alternatively, boron present at about 500 ppm in brine is concentrated to greater than or equal to about 30,000 ppm and added with sulfuric acid to deposit it in the form of boric acid to recover the same.

However, both methods have problems of high cost, low recovering rate, and process difficulty due to using a strong acid.

DISCLOSURE

Technical Problem

One aspect of the present invention relates to a boron recovering device, a method of recovering boron, and a boron recovering system. The device may shorten the reaction time for extracting boron in a boron-containing solution (e.g., brine), and the device may be operated in a continuous process so it can be applied to a large capacity industry.

Technical Solution

One embodiment of the present invention provides a boron recovering device including: an aeration-type water-channel reactor including a water channel; at least one aeration unit disposed in the water channel and aerating a boron-containing solution by passing through the water channel and depositing boron in the form of borax; and a precipitation bath precipitating the deposited borax in the boron-containing solution having passed through the aeration-type water-channel reactor and separating a filtrate by overflow.

A solid and liquid separating unit may be further included to separate moisture present in the borax obtained from the precipitation bath.

The aeration-type water-channel reactor may further include a pH-controlling unit to control pH of the boron-containing solution.

The aeration-type water-channel reactor may further include a nuclear particle feeding unit feeding nuclear particles into the boron-containing solution.

The pH-controlling unit may include a sensor measuring pH of the boron-containing solution, and an acid feeding unit feeding acid to reach a predetermined pH range.

The predetermined pH may range from about 7.5 to about 9.5.

The acid may be hydrochloric acid.

The nuclear particles may be fed by the nuclear particle feeding unit at a weight ratio of about 0.01 to about 0.5 based on boron content included in the boron-containing solution.

The aeration unit of the aeration-type water-channel reactor may be a tower-type aeration unit, and the tower-type aeration unit may use air.

The precipitation bath may further include a rotary scraper collecting borax precipitated in the precipitation bath into the central part of the precipitation bath.

A blade may be provided in the rotary scraper in a rotation direction, and the blade may be tilted at about 10 to about 45° from the vertical direction to the rotation axis toward the rotation direction.

The rotary scraper may be rotated at about 0.1 to about 1 rpm.

A rotary dump valve may be further provided to draw out the boron collected in a central part of the precipitation bath.

The solid and liquid separating unit may use a drum filter or a centrifugal filter.

According to another embodiment of the present invention, a method of recovering boron is provided that includes depositing boron included in a boron-containing solution in the form of borax, and precipitating the deposited borax to separate the borax and a filtrate.

The depositing boron included in the boron-containing solution in the form of borax may be performed by controlling pH of the boron-containing solution.

The pH may range from about 7.5 to about 9.5.

The depositing of the boron included in the boron-containing solution in the form of borax may include feeding nuclear particles into the boron-containing solution, and depositing boron included in the boron-containing solution in the form of borax.

The nuclear particles may be fed at a weight ratio of about 0.01 to 0.5 based on the boron content included in the boron-containing solution.

According to further another embodiment, a boron recovering system is provided that includes: a feeding unit feeding a boron-containing solution into an aeration-type water-channel reactor; a pH-controlling unit controlling pH of the fed boron-containing solution within about 7.5 to about 9.5; and a depositing unit depositing boron in the boron-containing solution in the form of borax by the pH-controlling unit.

Advantageous Effects

According to one embodiment, a device for shortening the reaction time for extracting boron from the boron-containing solution (e.g., brine) may be provided.

In addition, the device may be processed in a continuous process so as to be applied to a large capacity industry.

In addition, the device may be further adequately industrialized since it is highly corrosion-resistant.

DESCRIPTION OF DRAWINGS

FIG. 1 is a schematic view showing a boron recovering device according to one embodiment.

FIG. 2 is a perspective view showing a boron recovering device according to one embodiment.

FIG. 3 is a perspective view showing an aeration-type water-channel reactor.

FIG. 4 is a perspective view showing a precipitation bath.

DESCRIPTION OF SYMBOLS

1: aeration-type water-channel reactor
2: precipitation bath
3: feeding unit
4: pH-controlling unit
5: nuclear particle feeding unit
6: tower-type aeration unit
7: outlet unit
8: rotary scraper
9: blade
10: rotary dump valve
11: filtrate outlet

[Mode for Invention]

Exemplary embodiments of the present invention will hereinafter be described in detail. However, these embodiments are only exemplary, and the present invention is not limited thereto.

According to one embodiment of the present invention, a boron recovering device is provided that includes: an aeration-type water channel reactor including a water channel; at least one aeration unit disposed in the water channel and aerating a boron-containing solution by passing through the water channel and depositing boron in the form of borax ($Na_2B_4O_7 \cdot 10H_2O$, for example, $Na_2B_4O_5(OH)_4 \cdot 8H_2O$); and a precipitation bath precipitating the deposited borax in the boron-containing solution having passed through the aeration-type water channel reactor and separating a filtrate by overflow.

For example, the boron-containing solution may be brine. The boron-containing solution may be obtained from minerals or sea water, and may not be limited to brine.

The brine may include about 0.2 to 1.7 g/L of Li, about 0.005 to 25 g/L of Mg, about 0.005 to 15 g/L of Ca, about 70 to 120 g/L of Na, about 1 to 40 g/L of K, about 0.1 to 3 g/L of B, or the like.

However, the brine may include a different content of positive ions according to the brine origin region, and for example, the brine may include about 0.6 to 1.7 g/L of Li, about 0.005 to 0.060 g/L of Mg, <about 0.005 g/L of Ca, about 100 to 120 g/L of Na, about 25 to 35 g/L of K, about 2 to 3 g/L of B, or the like.

Hereinafter, the boron recovering device is described with reference to the drawings.

FIG. 1 is a schematic diagram showing a boron recovering device according to one embodiment.

FIG. 2 is a perspective view showing a boron recovering device according to one embodiment. FIG. 3 is a perspective view showing an aeration-type water-channel reactor, and FIG. 4 is a perspective view showing a precipitation bath.

As described in above, the boron-containing solution may be brine from which an element such as lithium, magnesium, calcium, or the like is separated.

While recovering boron, lithium, magnesium, calcium, or the like may be included as an impurity.

The method of separating lithium, magnesium, calcium, or the like from brine may include any known method, and one embodiment of the present invention is not limited thereto.

The boron recovering device according to one embodiment includes an aeration-type water channel reactor 1 depositing boron included in the boron-containing solution as a form of borax by passing the boron-containing solution therethrough.

The boron-containing solution may be slowly transported toward a water channel of the aeration-type water-channel reactor 1, and the boron included in the boron-containing solution may be extracted in the form of borax.

One or more aeration-type water-channel reactors 1 may be disposed in a precipitation bath 2.

In addition, the boron recovering device according to one embodiment may include the precipitation bath 2 separating the boron-containing solution including borax deposited by passing through the aeration-type water-channel reactor 1 to provide borax and a filtrate.

The precipitation bath 2 may continuously separate borax and a filtrate.

In addition, the boron recovering device according to one embodiment may further include a solid and liquid separating unit (not shown) separating moisture from the borax obtained from the precipitation bath 2.

The solid and liquid separating unit may be continuously operated.

Accordingly, the overall process of recovering borax from the boron of a boron-containing solution fed from the aeration-type water-channel reactor 1 may be continuously operated.

The aeration-type water-channel reactor 1 may be a device for depositing borax by selectively adding an acid and/or nuclear particle while slowly flowing the boron-containing solution and agitating it by aeration.

For example, it may include an opening and shutting type of feeding unit 3 that automatically controls the feeding speed of the boron-containing solution according to a predetermined flow rate of boron-containing solution.

In addition, to deposit borax, a pH-controlling unit 4 may be further provided for controlling pH of the boron-containing solution.

To improve the deposition speed of borax, a nuclear particle feeding unit 5 may be further provided for feeding a nuclear particle.

In addition, a tower-type aeration unit 6 may be further provided to provide an agitation effect for the borax deposition. At least one tower-type aeration unit may be provided.

In addition, in order to control the flow rate of the boron-containing solution, an opening and shutting outlet unit 7 may be provided to control the discharge amount of the boron-containing solution after completing the reaction.

In this case, the pH-controlling unit 4 may include an acid feeding unit to automatically measure pH of the boron-containing solution with a pH sensor and to automatically feed acid to reach a predetermined pH of the boron-containing solution using the measured data.

The predetermined pH may range from about 7.5 to about 9.5.

In addition, the acid fed to control pH may include hydrochloric acid. For example, the hydrochloric acid may have a concentration of about 10 to 40%, about 20 to 40%, about 30 to 40%, or about 35%. The percent concentration may be based on weight.

On the other hand, the nuclear particle feeding unit 5 may accelerate the deposition of boron by feeding the nuclear particles at the starting point of the borax deposition reaction, and thus the reaction time for depositing borax may be shortened.

The nuclear particles fed by the nuclear particle feeding unit 5 may be included at a weight ratio of about 0.01 to about 0.5 based on boron content in the boron-containing solution.

In addition, the tower-type aeration unit 6 preferably uses air.

On the other hand, the precipitation bath 2 may have a structure in which the boron-containing solution deposited with borax is slowly added into a central deep part of the precipitation bath 2, and while the boron-containing solution is transported toward the edge of the precipitation bath 2, the deposited borax is precipitated and the clean filtrate is recovered by flowing it over the edge of precipitation bath 2. In other words, the clean filtrate may be separated through the overflowing.

The precipitated borax is collected into the central part of the precipitation bath 2 by a rotary scraper 8 disposed on the bottom part of the precipitation bath 2, and discharged to the outside in the form of a highly-concentrated slurry by a rotary dump valve 10 disposed in the central bottom part of the precipitation bath 2.

The rotary scraper 8 may be rotated at about 0.1 to about 1 rpm.

In addition, a blade 9 of the rotary scraper 8 may be tilted about 10 to about 45° from the vertical direction to the rotation axis toward the rotation direction.

On the other hand, the solid and liquid separating unit may include a drum filter or a centrifugal filter.

In addition, all devices contacting the boron-containing solution (e.g., brine) may be made of PVC, PE, fiber reinforced plastic (FRP), high strength concrete slab, or the like for preventing corrosion.

The boron recovering device has an operation relationship as follows.

First, a boron-containing solution may be flowed in an aeration-type water-channel reactor 1 while the feeding amount is appropriately controlled to the predetermined transporting speed of the boron-containing solution through an opening and shutting feeding unit 3.

In addition, an acid (e.g., hydrochloric acid) may be added to control pH using a pH-controlling unit 4 until increasing the pH of the boron-containing solution to within about 7.5 to about 9.5.

The nuclear particles of borax powder are added into the lithium-containing solution at a weight ratio of about 0.01 to about 0.5 based on the boron amount in the boron-containing solution by a nuclear particle feeding unit 5 at the same time or sequentially while controlling pH.

The boron-containing solution added with acid and nuclear particles is slowly flowed at the predetermined flowing speed through an aeration-type water-channel reactor 1 and agitated by strong air bubbles generated from the tower-type aeration unit 6 disposed in the aeration-type water-channel reactor 1. Borax may be effectively deposited during the agitation.

The boron-containing solution is slowly flowed in the central deep part of the precipitation bath 2 after completing the reaction by passing through the aeration-type water-channel reactor 1 for 5 minutes, the inflow boron-containing solution is slowly transported to the edge of the water bath, the deposited borax particles settle on the bottom, and the clean filtrate is discharged by overflowing the precipitation bath 2.

The borax particles settled on the bottom of the precipitation bath 2 are slowly transported into the central part of the precipitation bath 2 by a rotary scraper 8 rotated at about 0.1 to about 1 rpm, and are discharged to the outside in the form of a highly-concentrated slurry by a rotary dump valve 10 disposed on the central part of the precipitation bath 2.

The discharged high concentration slurry is continuously separated into liquid and solid using a continuous drum filter or a bottom continuous centrifugal filter to separate borax (e.g., borax cake) and moisture (e.g., clean filtrate). The separated borax (e.g., borax cake) may be commercialized.

According to another embodiment, a method of recovering boron is provided that includes depositing boron included in the boron-containing solution in the form of borax, and precipitating the deposited borax to separate borax and a filtrate.

The depositing of the boron included in the boron-containing solution in the form of borax may be performed by controlling pH of the boron-containing solution, and the pH may be in a range of about 7.5 to about 9.5.

The depositing boron included in the boron-containing solution in the form of borax may further include feeding nuclear particles into the boron-containing solution such that the time for depositing borax may be shortened.

The nuclear particles may be added at a weight ratio of about 0.01 to about 0.5 based on the boron content included in the boron-containing solution, but is not limited thereto.

Other methods of recovering boron in the boron-containing solution are the same as in the operation principle of the boron recovering device according to one embodiment, so the detailed description thereof is omitted.

According to further another embodiment, a boron recovering system is provided that includes a feeding unit feeding a boron-containing solution into an aeration-type water-channel reactor, a pH-controlling unit controlling pH of the boron-containing solution to within about 7.5 to about 9.5, and a deposition unit depositing boron included in the boron-containing solution in the form of borax by the pH-controlling part.

The description of the boron recovering system is the same as in the boron recovering method according to one embodiment so is omitted.

The following examples illustrate the present invention in more detail. These examples, however, should not in any sense be interpreted as limiting the scope of the present invention.

EXAMPLE

A synthesis brine having a boron concentration of 6.02 g/l, a sodium concentration of 63.4 g/l, and a potassium concentration of 14.5 g/l was prepared, and pH of the synthesis brine was adjusted to 8.5. Fine borax powder was added into the brine at a weight ratio of 0.01 to 0.5 based on the boron content in the brine, and the brine was then agitated for 5 minutes. Then a reaction filtrate was taken to measure the boron concentration.

The following Table 1 shows the recovery rate of boron according to the example.

All embodiments showed a boron deposition rate of greater than or equal to 60%

TABLE 1

| Amount of nuclear particles (weight ratio) | 0.01 | 0.05 | 0.1 | 0.5 |
|---|---|---|---|---|
| Boron concentration of filtrate (g/l) | 2.22 | 2.20 | 2.13 | 2.35 |
| Boron extraction rate (%) | 63.1 | 63.5 | 64.6 | 61.6 |

※ weight ratio in the nuclear particle adding amount is based on the boron content in the brine.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. A method of recovering boron, comprising:
   depositing boron included in a boron-containing solution in a form of borax by aerating the boron-containing solution;
   controlling a pH value of the boron-containing solution to reach a predetermined pH range by feeding an acid into the boron-containing solution, wherein the predetermined PH range is from about 7.5 to about 9.5;
   precipitating the borax in the boron-containing solution to separate the borax from a filtrate by overflowing the filtrate; and
   discharging, by a rotary dump valve, the borax from the precipitation bath.

2. The method of claim 1, wherein depositing the boron included in the boron-containing solution in the form of the borax comprises:
   feeding borax particles into the boron-containing solution.

3. The method of claim 2, wherein feeding the borax particles comprises:
   feeding the borax particles at a weight ratio of about 0.01 to about 0.5 based on a boron content included in the boron-containing solution.

* * * * *